Oct. 4, 1927.  
G. A. McGREGOR  
1,644,536  
WHEEL GRIP OF FARM TRACTORS AND OTHER AGRICULTURAL MACHINERY  
Filed Sept. 22, 1925

Inventor  
G. A. McGregor

Patented Oct. 4, 1927.

1,644,536

UNITED STATES PATENT OFFICE.

GORDON ALEXANDER McGREGOR, OF STAWELL, VICTORIA, AUSTRALIA.

WHEEL GRIP OF FARM TRACTORS AND OTHER AGRICULTURAL MACHINERY.

Application filed September 22, 1925, Serial No. 57,902, and in Australia May 30, 1925.

This invention relates to improvements in grip devices for the wheels of farm tractors principally, but applicable also to the wheel-grips of cultivators and other agricultural machinery.

Ordinarily sixty-four grip devices are independently bolted to each wheel of a farm tractor in regular spaced arrangement, and it is customary for an agriculturalist to provide himself with two sets of wheel grip devices, one being considerably larger than the other in order that the tractor will operate efficiently in different classes of soil and under all ordinary climatic conditions.

The smaller grip devices are used on the tractor wheels when the ground is hard, but the larger grip devices are necessary when the soil is wet or moist so as to minimize slippage of the wheels. The removal of one set of the grip devices to permit the other set to be interchangeably fitted involves the expenditure of considerable labour and time, and the interchange is frequently rendered most difficult on account of the rusting of the securing bolts.

The present invention has been devised to obviate the disadvantages referred to by the provision of simple means whereby the wheel-grip devices can be both readily and conveniently converted from the smaller to the larger order or type, and vice versa, without removing or releasing the main bolts that secure the smaller grip devices to the wheels of the machine or implement.

According to the invention, the smaller grip devices for dry weather use are bolted, as customarily, to the wheels, and the larger or "wet-weather" wheel-grip devices are so constructed that they can be snugly fitted over the said smaller grip devices, suitable means being provided to lock the said larger grip devices against movement and accidental detachment when the smaller grip devices are nested therein.

Referring to the drawings.

Figure 1:
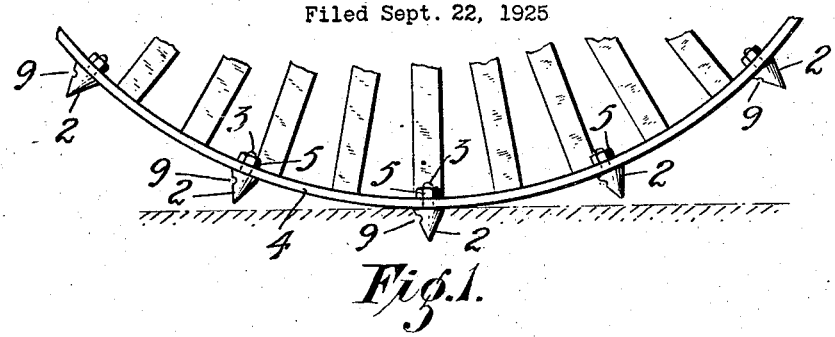
Figure 1 illustrates in side elevation part of a farm-tractor wheel equipped with the smaller dry-weather grip devices, which are fitted in regular spaced arrangement.
Figure 2:
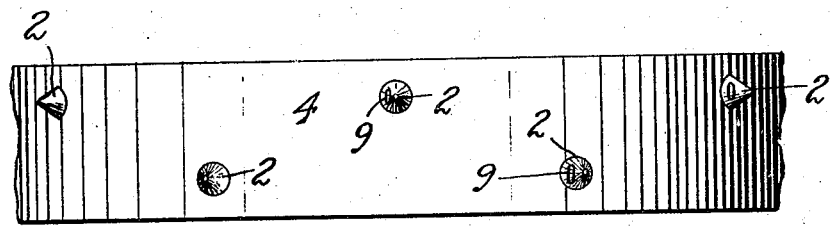
Figure 2 is a plan view of Figure 1.
Figure 3:
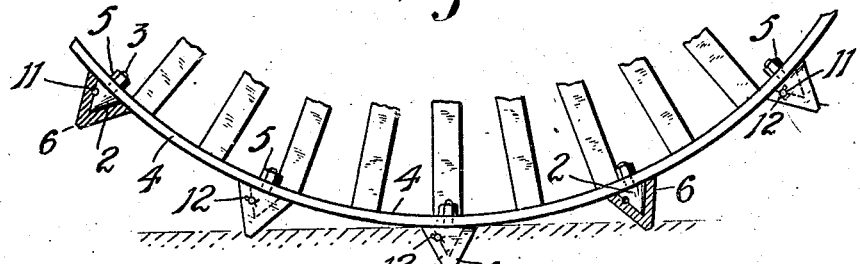
Figure 3 is a view in side elevation of part of the tractor wheel having the larger wet-weather grips detachably fitted over the smaller dry-weather grips.
Figure 4:
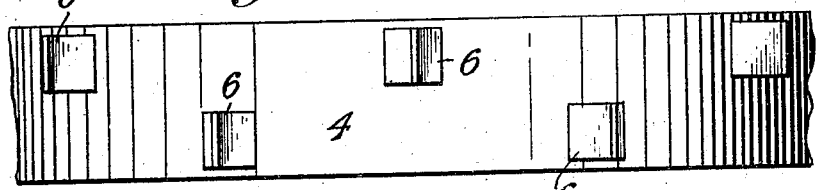
Figure 4 is a plan view of Figure 3.

In these views 2 designates the smaller dimensioned or dry-weather wheel grips, which are preferably conical in shape to minimize the amount of soil that will be collected thereon and to prevent soil being thrown from said grips into the bearings of the machine or implement upon rotation of the wheels to which they are fitted. Each of these conical grips has an integrally formed and screw-threaded stud 3 extending from the centre of its base. These screw-threaded studs are passed through appropriately spaced holes formed in the wheel rim 4, and they are fitted with nuts 5 that are tightened to bear against the inner surface of the wheel rim and thus secure said conical grips in fixed position.

The cone-shaped grips 2, although found very suitable for dry-weather conditions, are not satisfactory when the soil is wet, as it is found necessary to provide grip devices having considerably larger grip surfaces to prevent slippage of the wheels and thus enable the tractor to function efficiently. For this purpose, I provide a larger set of grip devices 6, preferably of prismatic design, each having a deep cone-shaped recess 7 formed in its base, adapting it to be fitted snugly over a dry-weather grip device 2 with the base portions 8 of said larger grip device bearing against the outer surface of the wheel rim 4.

A semi-circular tapering recess 9 is formed in each of the cone-shaped grips 2 at an approved distance from its base, and holes 10 having a corresponding taper are formed oppositely in the walls of the larger prismatic grips 6. When the prismatic wet-weather grips are turned on the cone-shaped grips 2, so that their holes 10 are brought into register with the recesses 9 in said grips 2, locking pins or keys 11 are driven through said holes and are accommodated in said recesses, thus securely locking the larger grips by wedging action upon the conical dry-weather grips 2.

Although in the rotation of the wheels, the weight of the tractor constantly tends to wedge the nested grip devices together, split pins or cotters 12 may be passed through the projecting ends of the locking pins or keys 11 to preclude their dislodgment by vibration or from other cause.

Figures 5, 6, 7:
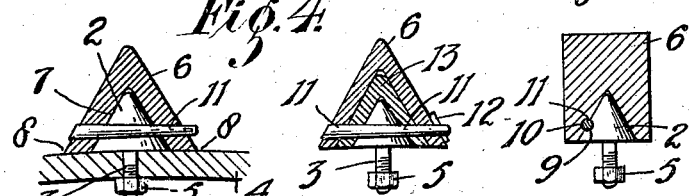
Figures 5 and 6 are views on enlarged scale in longitudinal section and in cross-section, respectively, of one of the nested wheel-grips and associated locking means.
Figure 7 is a view in section illustrating a modification of the invention.

Figure 7 illustrates a modified form of the invention comprising three nested wheel-grips, of which the fixed innermost grip member 2 and the intermediate member 13 are of conical configuration, and the outermost grip 6 is of prismatic design. Wheel-grip devices of this nested form will be found advantageous in enabling the tractor to work efficiently in different classes of soil and under varying climatic conditions. The intermediate member 13, however, may be so dimensioned as to function solely as a wearing element adapted for ready replacement when it becomes worn. By this means the conical dry-weather grip devices 2 are protected against undue wear and a constant snug fit of the outer wet-weather grips 6 is ensured.

What I do claim is:

Grips for the wheels of farm tractors and other agricultural machinery, consisting of small conical grips secured to the wheel rim in spaced relationship, larger grips of prismatic shape formed with cavities corresponding to the shape of the conical grips and adapted to be fitted over and snugly engage said conical grips with their base portions in abutment with the surface of the wheel rim, channels formed in the surfaces of the small grips at right angle to the axis of said grips, holes formed in the larger grips in alignment with said channels, and tapered retaining pins fitted through said holes and channels to draw the prismatic grips in close contact with the conical grips and force the base portions of said prismatic grips against the surface of the wheel, and to lock the conical and prismatic grips together.

In testimony whereof I affix my signature.

GORDON ALEXANDER McGREGOR.